United States Patent [19]
Coulter et al.

[11] 3,810,011
[45] May 7, 1974

[54] APPARATUS AND METHOD FOR ANALYZING THE PARTICLE VOLUME DISTRIBUTION FOR A PLURALITY OF PARTICLES OF DIFFERENT SIZE IN A QUANTITY OF LIQUID

[75] Inventors: Wallace H. Coulter, Miami Springs; Walter R. Hogg, Miami Lakes, both of Fla.

[73] Assignee: Coulter Electronics, Inc., Hialeah, Fla.

[22] Filed: Apr. 18, 1973

[21] Appl. No.: 352,361

Related U.S. Application Data

[63] Continuation-in-part of Ser. No. 40,231, May 25, 1970, Pat. No. 3,757,213.

[52] U.S. Cl.......... 324/71 CP, 235/92 PC, 324/65 R
[51] Int. Cl. ............................................ G01n 27/00
[58] Field of Search ...................... 324/71 CP, 65 R; 235/92 PC

[56] References Cited
UNITED STATES PATENTS

| | | | |
|---|---|---|---|
| 3,345,502 | 10/1967 | Berg et al. | 324/71 CP |
| 3,603,875 | 9/1971 | Coulter et al. | 324/71 CP |
| 3,757,213 | 9/1973 | Coulter et al. | 324/71 CP |

*Primary Examiner*—Alfred E. Smith
*Assistant Examiner*—Ernest F. Karlsen
*Attorney, Agent, or Firm*—Silverman & Cass

[57] ABSTRACT

The apparatus and method are utilized for ascertaining the volume of particles within predetermined particle-size ranges from a total amount of particulate matter comprising particles of different size, suspended in a quantity of liquid. The apparatus and method utilize the output signals from a particle analyzing device where the quantity of liquid containing particles of different size is caused to flow through a sensing zone including an electric current path of small dimensions and where each particle sensed generates an electrical signal having an amplitude proportional to the size of the particle sensed. The electrical signal is applied simultaneously to a plurality of comparators and to a pulse stretcher which stores the maximum amplitude of the signal. Each of the comparators is connected to a different threshold level and the output of each comparator is connected to logic signal generating circuitry including trailing edge and leading edge detectors, multivibrators and VETO AND circuits. The output of the pulse stretcher is connected to a plurality of output channels and the output of each VETO AND circuit is connected to an electronic switch in one of the output channels. The logic signal generating circuitry determines within which size range the particle falls and sends a logic signal from one of the AND circuits to one of the electronic switches to close the circuit in that output channel so that the signal from the pulse stretcher can be passed into the output channel. Signal converting circuitry is associated with the output channels for converting the stored maximum amplitude signal in the pulse stretcher to an electrical quantity capable of being accumulated in one of the integrators in one of the output channels. An electrical quantity is produced for each electrical signal generated by each particle sensed and is stored in an integrator in one of the output channels which is determined by the size of the particle. The output signal in each output channel is proportional to the total accumulated electrical quantities in that output channel and hence also proportional to the total volume of particles falling within a particular particle size range.

18 Claims, 4 Drawing Figures

APPARATUS AND METHOD FOR ANALYZING THE PARTICLE VOLUME DISTRIBUTION FOR A PLURALITY OF PARTICLES OF DIFFERENT SIZE IN A QUANTITY OF LIQUID

CROSS-REFERENCE TO RELATED APPLICATION

This application is a continuation-in-part of our earlier application, Ser. No. 40,231, filed on May 25, 1970, and now issued to U.S. Pat. No. 3,757,213.

BACKGROUND AND SUMMARY OF THE INVENTION

The present invention relates to a method and apparatus for ascertaining the total volume of particles within discrete particle-size ranges. In particular, the apparatus and method are utilized to determine the volume distribution of particles. Also, with the method and apparatus to be disclosed hereinafter, the contribution of each individual particle to the total volume of particles within a particle-size range is utilized. In other words, a very exact measurement of the particle volume distribution is obtained without counting and without averaging the particles which fall within two different particle sizes. With respect to the latter, the average volume of a plurality of particles falling within two particle sizes will not necessarily be the particle size midway between the two particle sizes and may instead be closer to one or the other of the respective particle sizes.

Also, it has been found that utilizing signals or pulses generated directly by a particle passing through a sensing zone does not give sufficiently good results. If all the signals or pulses had the same identical shape, good results will be obtained. However, because of zero drifts and the wide variation in pulse shapes and durations produced by particles passing through a sensing zone, the simple integral or average of the electrical signals or pulses provided an insufficiently accurate indication of the pulse size. This was due, it is believed, to the fact that pulse duration as well as pulse height were being measured. The apparatus and method hereinafter to be disclosed avoid this problem by converting the amplitude information or the maximum amplitude of each signal into an electrical quantity capable of being accumulated such as a voltage level or a current pulse. In this way pulse duration information is prevented from influencing the output signal.

With respect to prior art systems for ascertaining particle volume, reference may be had to the following:

| U.S. Pat. No. | Class |
| --- | --- |
| 2,656,508 | 324–71 |
| 3,127,505 | 235–92 |
| 3,153,727 | 250–222 |
| 3,233,173 | 324–61 |
| 3,259,842 | 324–71 |
| 3,271,671 | 324–71 |
| 3,331,950 | 235–92 |
| 3,392,331 | 324–71 |
| 3,345,502 | 235–92 |
| 3,461,280 | 235–92 |
| 3,699,319 | 235–151.34 |

Further information on particle analyzing devices and information on a method and apparatus similar to the method and apparatus disclosed herein for analyzing particle volume distribution can be found in United States application, Ser. No. 40,231, filed May 25, 1970, now issued to U.S. Pat. No. 3,757,213, the subject matter of which is incorporated herein by reference.

The method and apparatus to be disclosed hereinafter differ from the method and apparatus disclosed in application Ser. No. 40,231 by providing output signals which are proportional to the total volume of particles falling within a particle-size range. In the prior application, the output signals obtained were proportional to the total volume of particles above certain prticle sizes but not between two different particle sizes. Thus, with the method and apparatus disclosed in the prior application, one would have to subtract the volume of particles above one particle size from the volume of particles above the next lowest size to determine the volume of particles between the two particle sizes.

According to the invention there is provided an apparatus for ascertaining the volume of particles within predetermined particle-size ranges from a total amount of particulate matter comprising particles of different size suspended in a quantity of liquid utilizing the output signals from a particle-analyzing device wherein a quantity of liquid containing particles of different size is caused to flow through a sensing zone including an electric current path of small dimensions and wherein each particle sensed generates an electrical signal having an amplitude proportional to the size of the particle sensed. The apparatus includes circuitry for tracking each signal and for storing the maximum amplitude of each signal; circuitry for simultaneously comparing the maximum amplitude of each signal with a plurality of threshold levels to determine the particle-size range within which the particle which generated the electrical signal falls; circuitry for generating a logic signal for each particle-size range; a plurality of normally open-circuited output channels connected to the signal tracking and storing circuitry; a switching circuit in each of the output channels connected to the logic signal-generating circuitry, the logic signal-generating circuitry being operable to apply a logic signal to the switching circuit in the output channel for the particle-size range within which the particle falls; circuitry associated with each output channel for converting the stored maximum amplitude of the electrical signal into an electrical quantity which is directly related to the amplitude of the electrical signal and which is capable of being accumulated; and a device in each output channel for accumulating the electrical quantities produced therein, the output signal from each accumulating device being proportional to the total accumulated electrical quantities in that particular output channel and hence also proportional to the total volume of particles falling within a particular particle-size range.

Also, according to the invention, there is provided a method for ascertaining the volume of particles within predetermined particle-size ranges from a total amount of particulate matter comprising particles of different size suspended in a quantity of liquid. The method includes the steps of: passing the quantity of liquid through a sensing zone where each particle sensed generates an electrical signal having an amplitude which is directly proportional to the size of the individual particle sensed; tracking each signal and then storing the maximum amplitude of each electrical signal in an analog signal channel while simultaneously comparing the maximum amplitude with threshold levels to determine the particle-size range within which the particle which generated the electrical signal falls and generating a logic signal for that particle size range; aplying the stored maximum amplitude of the electrical signal to a plurality of normally open-circuited output channels; utilizing the logic signal to close the circuit in the output channel which is to receive electrical signals for particles within the particle-size rang within which the particle falls; converting the stored maximum amplitude of the electrical signal into an electrical quantity which is directly related to the amplitude of the signal and which is capable of being accumulated; accumulating in each output channel the electrical quantities produced therein; and deriving at least one output signal in each output channel which is proportional to the total accumulated electrical quantities in that output channel and hence also proportional to the total volume of particle falling within a particular particle-size range.

DESCRIPTION OF THE PREFERRED EMBODIMENTS

Figure 1A:
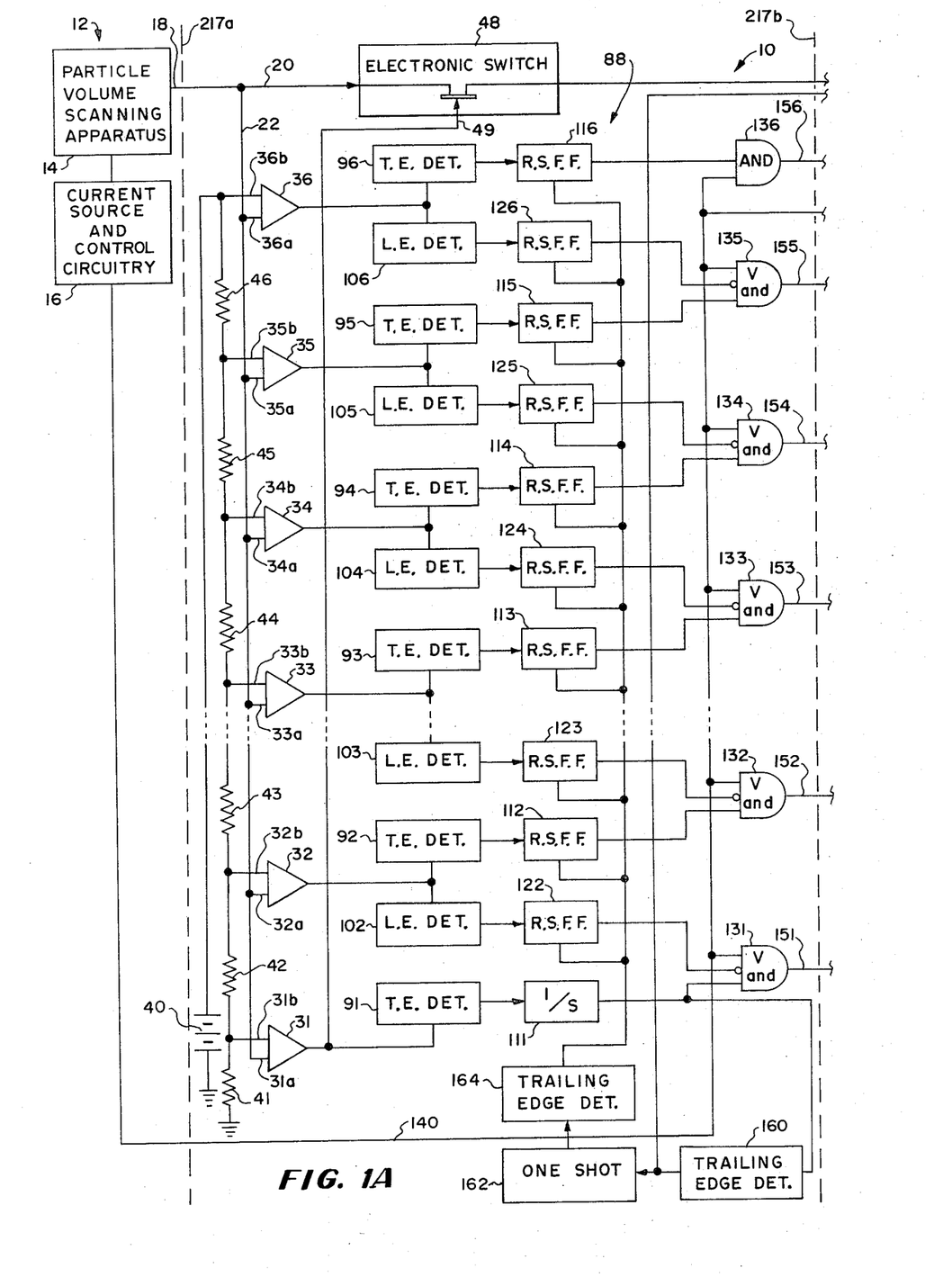
FIG. 1A is a schematic diagram of part of the electrical circuitry for apparatus forming one embodiment of the invention.
Figure 1B:
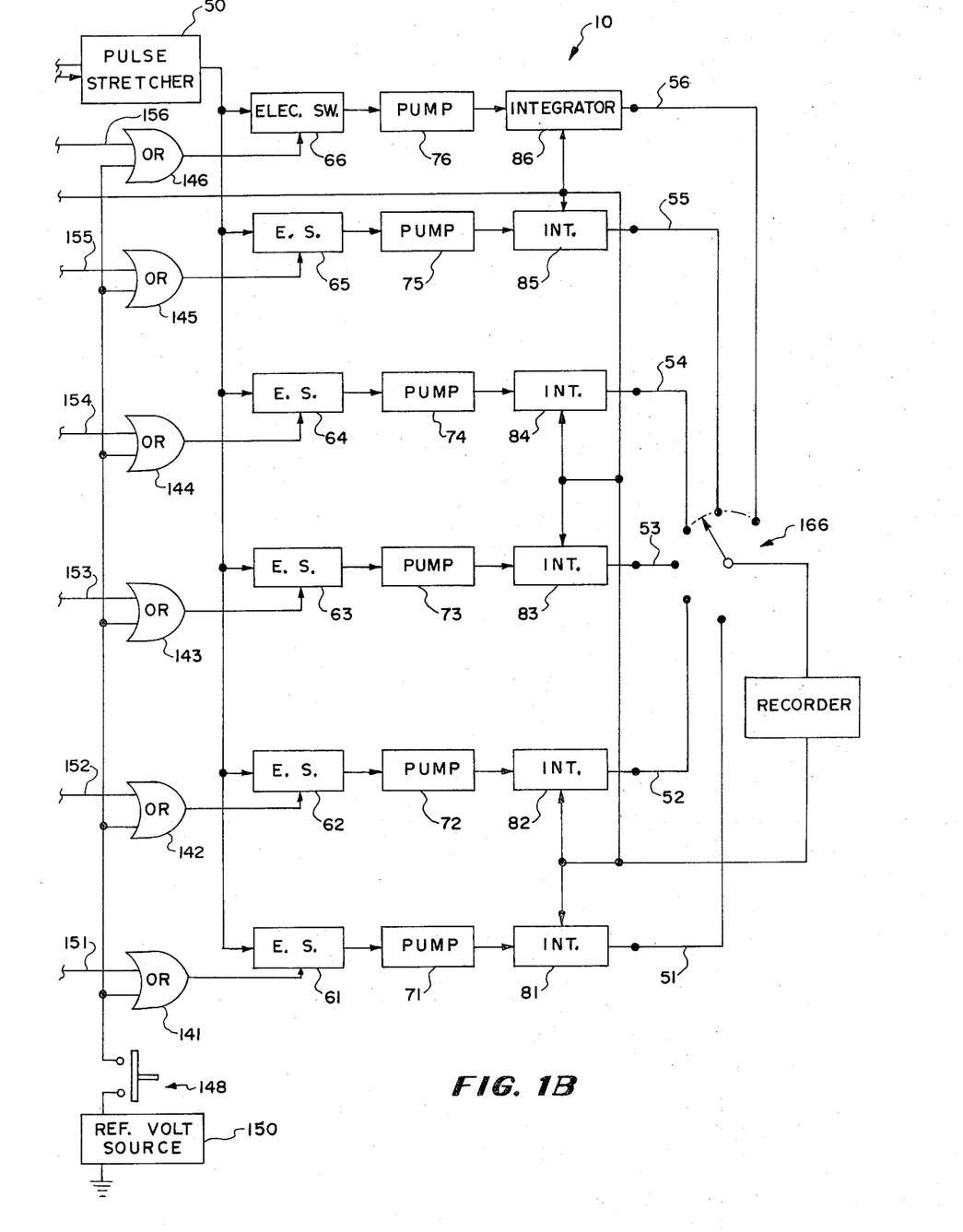
FIG. 1B is a schematic diagram of the remainder of the electrical circuitry for the apparatus.

One embodiment of the apparatus of the invention is illustrated schematically in FIGS. 1A and 1B and generally designated by the reference numeral 10. The apparatus 10 is connected to, and utilizes an electrical signal from, a particle-analyzing device generally designated by the reference numeral 12. The particle-analyzing device 12 includes a particle volume scanning apparatus 14 and a current source and control circuitry 16. The particle-analyzing device 12 is preferably of the Coulter type and further information on such a device can be found in several of the patents referred to above.

In the particle-analyzing device 12 a quantity of liquid containing a plurality of particles of different size is passed through a sensing zone including a current path of small dimensions. A particle passing through the sensing zone generates an electrical signal which is commonly referred to as a particle pulse. This electrical signal is applied via a conductor 18 to the apparatus 10. In the apparatus 10 the conductor 18 is connected to an analog signal channel 20 and another conductor 22 connected to a plurality of comparators 31 – 36. It will be noted that the portion of the conductor 22 between the comparators 32 and 33 is hyphenated to indicate that more comparators can be included in the bank of comparators shown in FIG. 1. As shown, the conductor 22 is connected to the inputs 31a – 36a of each of the comparators 31 – 36. Another input 31b – 36b of each of the comparators 31 – 36 is connected to a voltage threshold level in a voltage dividing circuit defined by a voltage source 40 and a plurality of series connected resistors 41 – 46.

As shown in FIGS. 1A and 1B, the analog signal channel 20 includes an electronic switch 48 having a control terminal 49 connected to the output of the comparator 31. The electronic switch will be closed once an electrical pulse or signal on the line 22 exceeds the threshold level established by the resistor 41. The analog signal channel 20 also includes a pulse stretcher 50 and the output of the pulse stretcher 50 is connected to a plurality of output channels 51 – 56. Each of the output channels 51 – 56 includes an electronic switch 61 – 66, a proportional pump circuit 71 – 76 and an accumulator or integrator 81 – 86.

The outputs of the comparators 31 – 36 are connected to logic circuitry 88 which determines within which particle-size range a particle falls and then sends a logic signal to one of the electrical switches 61 – 66 for closing the circuit in that one output signal channel 51 – 56. When this occurs, the maximum amplitude of the electrical signal or particle pulse from the pulse stretcher 50 is applied to the pump circuit 71 – 76 in the appropriate output channel. The phrase "maximum amplitude" will mean that part of a particle-produced pulse signal which is a measure of the volume of the particle that produced it herein and in the appended claims. As taught in copending application Ser. No. 357,888, filed May 7, 1973, this may not necessarily be the literal maximum if the apparatus of said copending application is substituted for block 48 of FIG. 1A. As shown, the logic signal-generating circuitry 88 includes a plurality of trailing edge detectors 91 – 96 and a plurality of leading edge detectors 102–106. The output of the comparator 31 is connected to the trailing edge detector 91 and the outputs of the comparators 32 – 36 are connected respectively to trailing edge detectors 92 – 96 and leading edge detectors 102 – 106. The output of the trailing edge detector 91 is connected to a one shot or univibrator 111. The output of each trailing edge detector 92 – 96 is connected to a multivibrator or RS flip-flop 112 –116 respectively. Likewise, the output of each of the leading edge detectors is connected to an RS flip-flop 122 – 126 respectively. The logic signal-generating circuitry 88 also includes a plurality of VETO AND circuits 131 – 135 and an AND circuit 136. As shown, the outputs of the RS flip-flops the multivibrators are connected to the AND circuits with the output of the RS flip-flops 112 – 115 being connected to one input of one of the VETO AND circuits 132 – 135 and the output of each of the RS flip-flops 122 – 126 is connected to the inverted input of one of the VETO AND circuits 131 – 135. The output of the RS flip-flop 116 is connected to one of the input terminals of the AND circuit 136. The remaining input terminals of each of the VETO AND circuits 131 – 135 and the AND circuit 136 is connected via a conductor 140 to the control circuitry 16. Also, in the illustrated embodiment the logic signal-generating circuitry 88 includes a plurality of OR circuits 141 – 146. One input of each of the OR circuits 141 – 146 is connected through a button control switch 148 to a reference voltage source 150. As shown, the outputs of the AND circuits 131 – 136 are identified with the reference numerals 151 – 156 and are each connected to one of the OR circuits 141 – 146.

The output lines or conductors 151 – 156 from the AND circuits 131 – 136 can be considered as logic signal channels over which logic signals are carried to one of the output channels 51 – 56.

In the operation of the apparatus 10, an electrical signal on particle pulse is applied to the analog signal channel 20 and to the conductor 22 leading to the comparators 31 – 36. As the amplitude of the signal increases, logical one output signals are established at the outputs of the comparators 31 - 32 - 33, etc., until the maximum amplitude of the signal is reached. Assuming that this maximum amplitude is between the threshold levels at inputs 33b and 34b of the comparators 33 and 34, then the leading edge detectors 102 and 103 will have triggered RS flip-flops 122 and 123 to apply a logical one signal to the inverted inputs of the VETO AND circuits 131 and 132. Thus, since these VETO AND circuits have a logical one at the inverted input thereof, they are prevented from producing a logical one output signal on the logic signal channels 151 and 152 respectively. Also, since the maximum amplitude of the electrical signal did not reach the threshold level at the input 34b of the comparator 34, the leading edge detector 104 did not trigger RS flip-flop 124 such that a logical zero is applied from the flip-flop 124 to the inverted input of the VETO AND circuit 133. Thus, if logical one signals are applied to the other inputs of the VETO AND circuit 133, a logical one output signal will be established on the output or logic signal channel 153. This occurs when the amplitude of the electrical signal falls below the threshold level at the input 33b of the comparator 33 and the output of the comparator 33 goes from logical one to logical zero. At that point the trailing edge detector 93 is operated to operate the flip-flop 113 which applies the logical one signal to the VETO AND circuit 133. A control logical one signal has, of course, already been applied to the inputs of all the AND circuits 131 – 136 via the conductor 140 from the control circuitry 16. Also, since the VETO AND circuits 131 and 132 have been prevented from operating as a result of the logical one signal applied to the inverted inputs thereof, operation of the trailing edge detectors 92 and 91 as the amplitude of the electrical signal decreases will not cause logical ones to appear at the output of the AND circuits 132 and 131. The signal on the logic signal channel 153 is then passed through the OR circuit 143 to the electronic switch 163 thereby closing the circuit path in the signal channel 53. This allows the maximum amplitude of the electrical signal which has been stored in the pulse stretcher 50 to be passed to the proportional pump circuit 73, charging the capacitor $C_p$ of the proportional pump with the charge $Q = C_p e$, where $e$ is the amplitude of the stored signal. When the electrical signal decreases below the threshold on the input 31b of the comparator 31, the one shot 111 is triggered and applies a signal to a control trailing edge detector 160. The output of the trailing edge detector 160 is then applied to the pulse stretcher 50 for resetting same. That is to say the electrical signal on the pulse stretcher is cleared and the output of the pulse stretcher quickly drops to ground. Since the pulse stretcher is connected to the pump circuit 73 through the electronic switch 63, the charge stored in the pump capacitor is then dumped into the integrator 83. The charge in the integrator 83 then increases by a like amount and the voltage at the output of the integrator 83 rises to a new plateau. The duration of the pulse from the one shot or univibrator 111 is adjusted to provide a minimum time for any of the electronic switches 61 – 66 to close the corresponding circuit path so that the pump capacitor in the pump circuit connected thereto has a chance to fully charge to the maximum amplitude of the electrical signal stored in the pulse stretcher 50.

The output from the control trailing edge detector 160 is applied to a one-shot or univibrator 162. The output from the one-shot 162 is then applied to another control trailing edge detector 164. The output from the trailing edge detector 164 is applied to the reset input of all of the R.S. flip-flops in the logic circuitry 88. The duration of the pulse from the one-shot 162 is adjusted to ensure that a complete transfer of charge from the pump circuit to the integrator in one of the output channels 51–56 is made before the trailing edge of the output pulse is sensed by the control trailing edge detector 164 for resetting all of the multivibrators. Once all the multivibrators are reset, the apparatus 10 is ready for receiving another electrical signal or particle pulse from the particle analyzing device 12. Reset pulses are applied to all of the multivibrators and if any of them had not been previously set, such as the multivibrators 124, 114, 125, 115, 126 and 116, nothing happens. In any event all of the multivibrators are then reset and ready for the next particle pulse.

As shown the output channels 51–56 are connected to terminals of a multi-position switch mechanism 166 which is connected in turn to a recorder 168. It will be understood that after the quantity of liquid has been passed through the sensing zone in the particle analyzing device 12, the switching mechanism 166 is operated to sequentially connect the output channels 51–56 to the recorder 168 which will then record the output signal level on each of the integrators 81–86 in sequence. The signal level on each of the integrators 81 will be proportional to the total volume of particles falling within a size range defined by the threshold levels on the comparators 31–36 and this information regarding particle volume distribution is recorded in the recorder 168. Alternatively, the recorder 168 could be replaced with a visual display device on which the total volume distribution can be displayed. Such an alternate method is fully disclosed in a copending application Ser. No. 195,722, filed Nov. 4, 1971, by Robert L. Talbert and assigned to the same assignee.

After all of the information has been recorded in the recorder 168, the control circuitry 16 is operated to remove the logical one a signal via the conductor 140 to all of the AND circuits 131–136 to disable them and prevent them from putting out a logical one signal on the logic signal channels 151–156. The conductor 140 also connects the control circuitry to each of the integrators 81–86 for clearing the charge stored in each of the integrators to ready the apparatus 10 for analyzing the volume distribution of particles in another quantity of liquid.

It will be understood of course that all particle pulses which cross the lowest threshold level on the input 31b of the comparator 31 are analyzed in exactly the same manner except that different numbers of threshold levels may be crossed. In the process, however, aliquots of charge which are the analogs of particle volume are added into the charge stored by the output integrators 81–86 exactly as they occur with no reference to a guess as to where the center of the window or size range as defined between two of the output channels 51–56 is. This has the dual advantage of increased accuracy and greater simplicity in determining the volume distribution of particles for different size ranges of particles.

One difficulty sometimes incurred with apparatus comprising electrical components of the type included in the apparatus 10 is that the component values for the various components are depended upon to give correct or consistent factors of proportionality. In order to be able to adjust for any differences in the component values as a result of component tolerances, the OR circuits 141–146 are utilized. These OR circuits 141–146 permit all the electronic switches 61–66 to be turned on at once by applying a logical one signal to all of these OR circuits by means of the voltage source 150. This is accomplished by depressing the button switch 148. When the button is depressed all the pump circuits and integrators receive identical inputs regardless of the nature of the pulse train applied via the conductor 18 to the apparatus 10. Therefore all the integrators should have the same output signal. If they do not, a suitable component in each of the output channels 51–56 can be trimmed or adjusted to make all the outputs equal. By utilizing pump circuits, a conventional adjustment is obtained by paralleling the pump capacitor with a small trimmer capacitor. In this respect, it is to be noted that a typical pump capacitor has a capacitance in the hundreds of picofarads and trimmer capacitors are readily available having a variable capacitance between 3 and 50 picofarads.

Figure 2A:
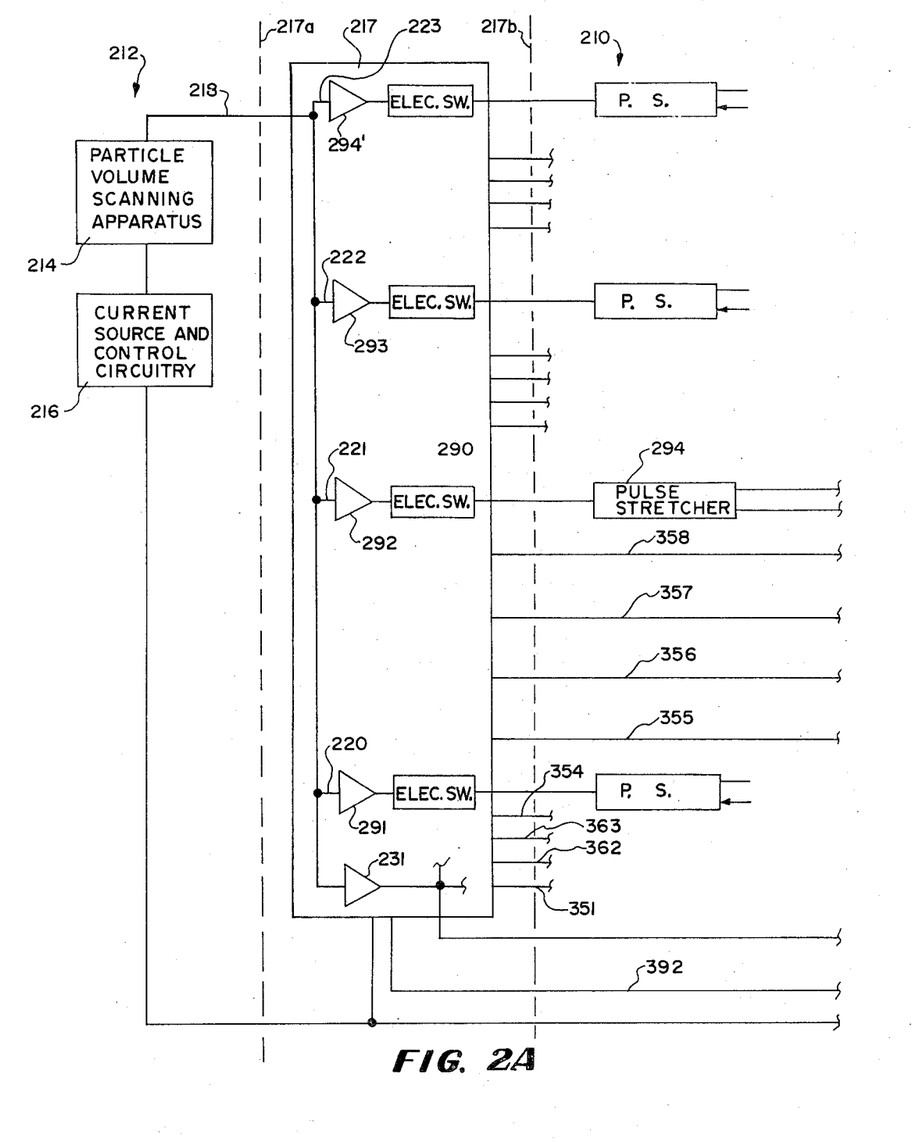
FIG. 2A is a schematic diagram of part of the electrical circuitry for apparatus forming another embodiment of the invention.
Figure 2B:
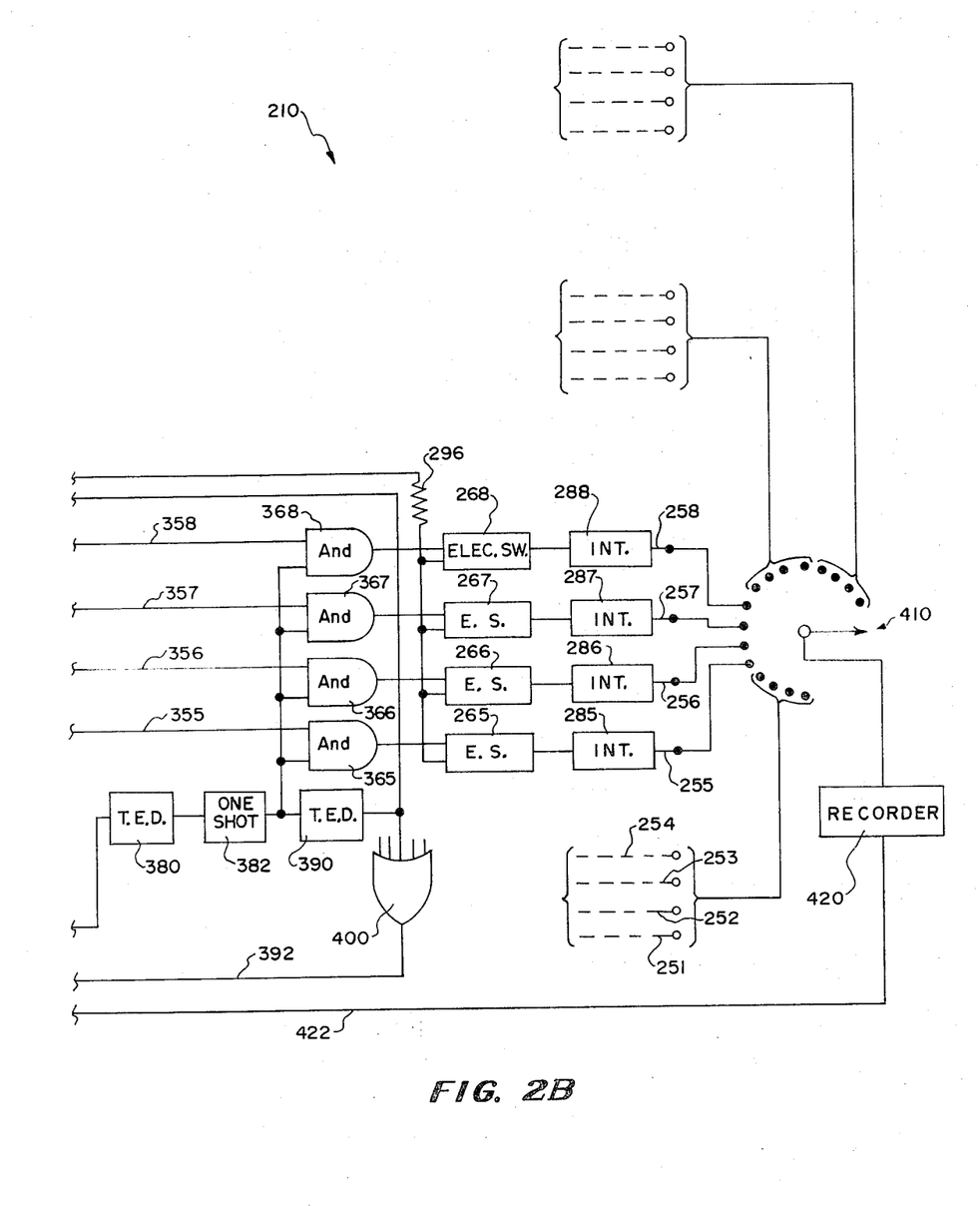
FIG. 2B is a schematic diagram of the remaining electrical circuitry for the apparatus forming another embodiment of the invention.

Referring now to FIGS. 2A and 2B, another embodiment of the apparatus of the invention is shown therein and generally designated by the reference numeral 210. The apparatus 210 receives signals or pulses from a particle analyzing apparatus 212 comprising a particle volume scanning apparatus 214 and a current source and control circuitry 216. The particle analyzing device 212 is preferably of the Coulter type and essentially the same as the particle analyzing device 12 shown in FIG. 1A. Much of the circuitry in the apparatus 210 is identical to circuitry of the apparatus 10 shown in FIG. 1A. In this respect the circuitry contained between broken lines 217a and 217b in FIG. 1A also is included between the lines 217a and 217b in FIGS. 2A except for some modifications which will be described hereinafter. This circuitry is identified schematically in FIG. 2A by the reference numeral 217 and includes the circuitry for establishing threshold levels, the plurality of comparators and the logic signal generating circuitry shown in FIG. 1A.

The apparatus 210 differs from the apparatus 10 in two respects. First of all, a plurality of analog signal channels are provided so that the pulse stretchers therein can be operated in their most appropriate range. Stated another way, a plurality of pulse stretchers are provided together with suitable amplifying and attenuating circuit elements in each of the analog signal channels so that none of the pulse stretchers are driven to saturation. In this way, more accurate results are obtained. Also, the signal converting circuitry is formed by resistive elements instead of by pump ciruits as was the case for the apparatus 10 shown in FIGS. 1A and 1B.

The plurality of analog signal channels are designated by the reference numerals 220–223. Also the first or lowest threshold comparator of the plurality of comparators in the circuitry 217 is shown at 231. This comparator is substantially identical to the comparator 31 shown in FIG. 1A.

In the apparatus 210 there are sixteen output channels as opposed to the six output channels in the apparatus 10. The output channels are divided into four groups with an analog signal channel being associated with each one of the groups. Except for the fact that each of the groups of output channels are associated with different threshold levels applied to the comparators in the circuitry 217, the operation of the circuitry in the output channels and the circuitry preceding same is the same for all four groups. Accordingly, reference will be made only to the first and second groups of output channels which are identified by the reference numerals 251–258. Furthermore, since each of the groups of output channels and the analog signal channel associated therewith are essentially the same, and operate in essentially the same manner, only the second group of output channels 255–258 and the circuitry preceding same will be decribed in detail.

As shown each of the output channels 244–258 includes an electronic switch 265–268 and an integrator 285–288 respectively. As shown, the analog signal channel 221 assoicated with this group of output channels 255–258 includes an electronic switch 290, an amplifier 292, a pulse stretcher 294 and a resistor 296. Although not shown in complete detail, it will be understood that each of the other analog signal channels 220–223 also include an electronic switch, an amplifier, a pulse stretcher and a resistor.

The amplifier 292 amplifies the particle pulse which is passed through the electronic switch 290 to a value within the operating range of the pulse stretcher 294.

The resistor 296 attenuates the output signal from the pulse stretcher which will be the maximum amplitude of the particle pulse received by the pulse stretcher 294. The amplifier 292 and the resistor 296 permit the pulse stretcher to operate within its dynamic range and without the pulse stretcher being driven into saturation. The resistor 296 attenuates the output signals so that an appropriate current signal is applied to the output channels 255–258. The combination of amplifier and resistor before and after each pulse stretcher together with the duration of the output pulse from the one-shot 382, to be discussed, ensures that the same sensitivity for all channels with respect to volt-out-per-cubic-micron-in is obtained.

As shown, there are a plurality of logic signal channels coming out of the circuitry 217 and eight of these channels are designated by the reference numerals 351–358. These signal channels are analogous to the signal channels 151–156 shown in FIGS. 1A and 1B and carry logic signals from the logic signal generating circuitry within the circuitry 217. The logic signal channels 355–358 are connected respectively to one input of an AND circuit 365–368 respectively. As shown, control circuitry for operating the AND circuits 365–368 to pass a signal to one of the electronic switches 265–268 is connected between the output of the comparator 231 and each of the AND circuits 367–368. This control circuitry includes a control trailing edge detector 380 and a univibrator or one-shot 382. Assuming that the maximum amplitude of the particle pulse was such that a logic signal was established on the logic signal channel 358, then when the pulse amplitude drops below the threshold level applied to the comparator 231, the output of the comparator 231 goes from logical one to logical zero. This will trigger the trailing edge detector 380 which will then operate the one-shot 382. The one-shot 382 will then put out a pulse of predetermined duration which is applied to all of the AND circuits 365–368.

The duration on the one-shot univibrator 382 is chosen so that the AND circuits such as the AND circuit 368 are enabled for a predetermined period of time. In this way the one-shot or univibrator 382 cooperates with the resistor 296 in converting the maximum amplitude of the electrical signal or particle pulse received by the pulse stretcher 294 to an electrical quantity which is accumulated in one of the integrators such as the integrator 288. Thus, recapitulating, a logical one signal is established on the logic signal channel 358. Then when the electrical signal falls below the threshold level applied to the comparator 231, the trailing edge detector 380 and the one-shot 382 are operated. As a result, a pulse of predetermined duration is applied to the AND circuit 368 and with logical one signals applied to both inputs of the AND circuit 368, the AND circuit 368 puts out a logical one signal which is applied to the electronic switch 268 in the signal channel 258. Current then flows through the resistor 296, through the switch 268, to the integrator 288 for a predetermined time as determined by the duration of the pulse from the one-shot 382.

In one embodiment, the output of the one-shot or univibrator 382 is applied to one input of each of the sixteen AND circuits in each of the logic signal channels. In this way the same timing pulse is utilized for each current pulse applied to each of the output channels.

As shown, a trailing edge detector 390 is connected to the output of the one-shot 382 and sends a reset pulse via conductor 392 to the circuitry 217. This reset pulse is applied to the flip-flops within the circuitry 217 for resetting same much the same way that the pulse from the trailing edge detector 164 is applied to the flip-flops in FIG. 1A.

To speed up the operation of the apparatus 210 and to avoid extremely large or extremely small values of resistance 296 and the capacitors of the integrators in each group, control circuitry similar to the trailing edge detector 380, one-shot 382 and the trailing edge detector 390 can be connected between the output of each comparator for the lowest threshold for each group of comparators for each group of signal channels. The output of each one-shot is then applied to the four AND circuits for that particular group of logic signal channels. Then the output from the second trailing edge detector is applied to an OR circuit 400. If this modification is utilized, the one-shots must be accurately calibrated so that the durations of their output pulses, taking into account the value of the resistance 296, the gain of the amplifiers 291–294', and the values of the integrating capacitors in each group, result in the same volts-out-per-cubic-microns-in overall sensitivity. With this modification once the amplitude of the electrical signal or particle pulse falls below the threshold level on the comparator with the lowest threshold level of the group of comparators for each group of four logic signal channels, the flip-flops in the circuitry 217 will be reset and the electrical quantity or current pulse, with the amplitude of the current pulse determined by the resistor in the analog signal channel and the duration of the current pulse determined by the pulse duration of the pulse from the one-shot in the control circuitry, is passed to the integrator in the output channel sooner.

After a quantity of liquid containing particles therein hs been passed through the sensing zone, a switching mechanism 410, similar to the switching mechanism 166 shown in FIG. 1b, is operated to sequentially connect the output channels to a recorder 420. The control circuitry 216 is connected via a conductor 422 to the recorder 420 for causing same to record the various signal levels on the various integrators in the output channels. After this has been accomplished, the control circuitry 216 will clear all the integrators and also inhibit the operation of the AND circuits in the control circuitry 217.

Although not shown, it is to be understood that a plurality of OR circuits similar to the OR circuits 141–146 can be connected into the logic signal channels of the apparatus 210 for the purpose of calibrating the output channels of the apparatus 210.

From the foregoing detailed description of the embodiments of the invntion, it will be understood that the apparatus and method of the invention provide a simply and accurate means for obtaining information on the particle volume distribution for particles falling within different size ranges. Also, it will be obvious to those skilled in the art that certain modifications and variations can be made to the apparatus and method of the invention without departing from the spirit or scope of the invention. In this respect some of the modifications and variations have already been described above. Accordingly, the scope of the invention is only to be limited as necessitated by the accompanying claims.

What it is desired to secure by Letters Patent of the United States is:

1. A method for ascertaining the volume of particles within predetermined particle-size ranges from a total amount of particulate matter comprising particles of different size suspended in a quantity of liquid, said method comprising the steps of:
   A. passing the quantity of liquid through a sensing zone where each particle sensed generates an electrical signal having an amplitude which is directly proportional to the size of the individual particle sensed;
   B. tracking each signal and then storing the maximum amplitude of each electrical signal in an analog signal channel while simultaneously comparing the maximum amplitude with threshold levels to determine the particle-size range within which the particle which generated the electrical signal falls and generating a logic signal for that particle-size range;
   C. applying the stored maximum amplitude of the electrical signal to a plurality of normally open-circuited output channels;
   D. utilizing the logic signal to close the circuit in the output channel which is to receive electrical signals for particles within the particle-size range within which the particle falls;
   E. converting the stored maximum amplitude of the electrical signal into an electrical quantity which is directly related to the amplitude of the signal and which is capable of being accumulated;
   F. accumulating in each output channel the electrical quantities produced therein; and
   G. deriving at least one output signal in each output channel which is proportional to the total accumulated electrical quantities in that output channel and hence also proportional to the total volume of particle falling within a particular particle-size range.

2. The method according to claim 1 wherein the signal stored in the alalog signal channel is a voltage signal which is applied to a pump in the close circuited output channel, the output from the pump constituting said electrical quantity and said accumulating being accomplished by integrating said electrical quantities.

3. The method according to claim 1 wherein the stored signal in the analog signal channel is a voltage signal which is converted to a current signal and the particular channel which is close-circuited to receive said current signal is closed for a predetermined period of time for each electrical signal generated, the electrical quantity generated for each particle being equal to the current signal multiplied by a time constant equal to the predetermined time period, and the electrical quantity is accumulated by integrating the current signal for the predetermined period of time.

4. The method according to claim 1 wherein the output channels are divided into a plurality of groups and each electrical signal is tracked and stored in a plurality of analog signal channels, one each for each of the groups of output channels, the analog signal in each analog signal channel being multiplied by a sensitivity factor.

5. An apparatus for ascertaining the volume of particles within predetermined particle-size ranges from a total amount of particulate matter comprising particles of different size suspended in a quantity of liquid utilizing the output signals from a particle-analyzing device wherein a quantity of liquid containing particles of different size is caused to flow through a sensing zone including an electric current path of small dimensions and wherein each particle sensed generates an electrical signal having an amplitude proportional to the size of the particle sensed, said apparatus comprising:

A. means for tracking each signal and for storing the maximum amplitude of each signal;

B. means for simultaneously comparing the maximum amplitude of each signal with a plurality of threshold levels to determine the particle-size range within which the particle which generated the electrical signal falls;

C. means for generating a logic signal for each particle-size range;

D. a plurality of normally open-circuited output channels connected to said signal tracking and storing means;

E. switch means in each of said output channels connected to said logic signal-generating means, said logic signal-generating means being operable to apply a logic signal to the switch means in the output channel for the particle-size range within which the particle falls;

F. means associated with each output channel for converting the stored maximum amplitude of the electrical signal into an electrical quantity which is directly related to the amplitude of the electrical signal and which is capable of being accumulated; and G. means in each output channel for accumulating the electrical quantities produced therein, the output signal from each accumulating means being proportional to the total accumulated electrical quantities in that particular output channel and hence also proportional to the total volume of particles falling within a particular particle-size range.

6. The apparatus according to claim 5 wherein said means for tracking and storing each signal includes a pulse stretcher.

7. The apparatus according to claim 5 wherein said comparing means includes a plurality of comparators each having first and second inputs, said first input of each comparator being connected to one of the threshold levels and said second input of each of said comparators being connected to the particle-analyzing device.

8. The apparatus according to claim 7 wherein said logic signal-generating means comprises a trailing edge detector, a leading edge detector, and first and second multivibrators for each comparator except the comparator connected to the lowest threshold level the output of each of the other comparators being connected to an input of both the trailing edge detector and the leading edge detector, the output of said trailing edge detector being connected to said first multivibrator and the output from said leading edge detector being connected to said second multivibrator, an AND circuit connected to said first multivibrator associated with said comparator at the highest threshold level, a plurality of VETO AND circuits each of which is connected to said second multivibrator associated with a comparator connected to one of said threshold levels and to said first multivibrator associated with the comparator connected to the next highest threshold level, and a trailing edge detector and a univibrator connected in series between the comparator connected to the lowest threshold level and one of said VETO AND circuits, said logic signals appearing at the outputs of said AND circuits.

9. The apparatus according to claim 8 wherein an OR circuit is connected to the output of each of the AND circuits and the other input of each of the OR circuits is connectable to a reference voltage source through a control switch for calibration purposes.

10. The apparatus according to claim 5 wherein said converting means includes a proportional pump circuit in each of said output channels.

11. The apparatus according to claim 5 wherein each of said accumulating means in each of said output channels is an integrator.

12. The apparatus according to claim 5 wherein the output of said univibrator associated with said comparator connected to the lowest threshold is connected to a control trailing edge detector, the output of said control trailing edge detector being connected to said pulse stretcher for resetting same for receiving another electrical signal from the particle-analyzing device.

13. The apparatus according to claim 12 including a univibrator connected to said control trailing edge detector and a second control trailing edge detector connected to the output of said univibrator, the output of said second trailing edge detector being connected to said multivibrators associated with all the comparators, except the comparator connected to the lowest threshold level for resetting the multivibrators for another electric signal.

14. The apparatus according to claim 5 wherein control circuitry of the particle-analyzing device is connected to all of the AND circuits for controlling the operation thereof and is connected to all of the accumulating means for removing the total accumulated electrical quantities therefrom after a quantity of liquid has been analyzed to prepare the accumulating means for the analysis of another quantity of liquid having particles therein.

15. The apparatus according to claim 5 wherein the output channels are divided into groups and a pulse stretcher is associated with each group of channels and each pulse stretcher is located in an analog signal channel all of which are connected to a conductor which is connected to the particle-analyzing device.

16. The apparatus according to claim 15 wherein each analog signal channel includes an amplifier connected between said conductor and said pulse stretcher and a resistor connected between the output of said pulse stretcher and one group of said output channels.

17. The apparatus according to claim 16 including a group of logic signal channels from said logic signal-generating means associated with each group of output channels, a plurality of AND circuits each connected to one of said logic signal channels and having an output connected to one of said switch means in one of said output channels, a control trailing edge detector connected to the output of the comparator connected to the lowest threshold level and a univibrator connected between the output of said control trailing edge detector and one input of each of said AND circuits and being operable when the amplitude of the electrical signal falls below the threshold of the lowest threshold level to produce a short pulse which is applied to each of said AND circuits to which said logic signal channel is connected for passing a logic signal for a predetermined time period, equal to the duration of the short pulse, to one of said switch means in one of said output channels to allow current to flow through said resistor connected to the output of one of said pulse stretchers and through said one switch means to one of said accumulating means for a predetermined period of time, said converting means comprising each resistor connected between one of said pulse stretchers and a group of said output channels.

18. The apparatus according to claim 17 wherein a second control trailing edge detector is connected to the output of said univibrator, the output of said second control trailing edge detector being connected to said pulse stretchers for resetting same and to said logic signal-generating means for resetting same for another electrial signal.

* * * * *